United States Patent

Stentz et al.

[11] Patent Number: 5,911,669
[45] Date of Patent: Jun. 15, 1999

[54] VISION-BASED CROP LINE TRACKING FOR HARVESTERS

[75] Inventors: Anthony Stentz; Mark Ollis, both of Pittsburgh; Kerien Fitzpatrick, Sewickley; Regis Hoffman, McMurray; William Whittaker, Pittsburgh, all of Pa.

[73] Assignee: Carnegie Mellon University, Pittsburgh, Pa.

[21] Appl. No.: 08/840,771

[22] Filed: Apr. 16, 1997

Related U.S. Application Data

[60] Provisional application No. 60/016,236, Apr. 19, 1996.
[51] Int. Cl.$^6$ .................................................. G06F 15/20
[52] U.S. Cl. ................................. 56/10.2 F; 364/424.07
[58] Field of Search ........................... 56/10.2 A, 10.2 F, 56/10.2 R, 10.2 J, 11.9, 16.7, DIG. 15; 172/2, 4, 4.5; 364/413.13, 424.07; 382/10, 11, 12, 13, 14, 15

[56] References Cited

U.S. PATENT DOCUMENTS

| 4,077,488 | 3/1978 | Bennett, Jr. et al. ...................... 180/98 |
| 4,482,960 | 11/1984 | Pryor ........................................ 364/424 |
| 4,700,301 | 10/1987 | Dyke ........................................ 364/424 |
| 5,442,552 | 8/1995 | Slaughter et al. .................. 364/424.07 |
| 5,444,965 | 8/1995 | Colens ................................... 56/10.2 A |

OTHER PUBLICATIONS

The Philadelphia Inquirer, Jul. 11, 1996; (Farm Machines: The Next Step in Field Robotics), (Robo–Cop – A farm tractor that drives itself?).

D16 Jan. 1996 – Farm Futures; A window on AG innovation (Robo–Crop).

*Primary Examiner*—Michael J. Carone
*Assistant Examiner*—Robert Pezzuto
*Attorney, Agent, or Firm*—Griffin, Butler, Whisenhunt & Szipl

[57] ABSTRACT

A self-propelled harvester is provided with apparatus for tracking a crop line and steering the harvester along the crop line without operator assistance. The apparatus includes a video camera for viewing the landscape in front of the harvester and forming an image which may be electronically scanned pixel-by-pixel and line by line to produce a video signal containing information regarding the spectral characteristics of the image at each pixel. A microprocessor is programmed to act as a discriminator and a segmentor. The discriminator produces discriminant signals D(i,j) where i is the magnitude of a discriminant function and j is the relative position of a pixel on a scan line. The segmentor determines a step function which best fits the magnitudes of the discriminant signals for one scan line. The pixel position $j_n$ corresponding to the step of this step function is taken as a vote on the location of the crop line and thus a vote on the direction the harvester should be steered. The votes are summed for each pixel position j over one full scan of image. The summed votes are then normalized, time-weighted, and averaged with the normalized and time-weighted votes derived from previously scanned images to derive a steering command.

21 Claims, 4 Drawing Sheets

VISION-BASED CROP LINE TRACKING FOR HARVESTERS

RELATED APPLICATIONS

This application claims benefit of provisional application Ser. No. 60/016,236 filed Apr. 19, 1996.

FIELD OF THE INVENTION

The present invention relates to agricultural machines and more particularly to self-propelled crop harvesting machines which, as part of the harvesting process, cut the crop or the plants on which the crop was grown. The invention provides an automatic steering control capable of determining the crop line between cut and uncut crop and steering the harvesting machine along the crop line as it traverses a field.

BACKGROUND OF THE INVENTION

In recent years many of the functions of harvesting machines normally controlled manually by an operator have been automated. Audible and visual sensing by the operator have been replaced with optical, sonic, magnetic, radio frequency and other types of sensors. Microprocessors, operating in response to conditions sensed by the sensors, have replaced manual operator control of the mechanical functions. However, it is still necessary to have an operator for steering the harvester to move along a crop line.

Human capability is a key limitation in the efficiency of harvesting. The harvester is operated most efficiently at maximum speed and with one end of the cutter mechanism slightly overlapping the crop line between cut and uncut crop. If there is is no overlap, an uncut strip of crop is left in the field. On the other hand, if the overlap is too great the maximum width of crop is not cut.

Currently available harvesters are operable at ground speeds of up to 4 to 5 miles an hour and future harvesters are being designed for operation at higher speeds. Although an operator may easily steer a harvester along a crop line at speeds of 4 to 5 miles an hour, the constant attention required to accomplish this is extremely tiring and an operator can not maintain maximum harvesting efficiency at this speed for long periods of time. Thus efficiency of utilization of the harvester could be increased by providing a form of "cruise control" which automatically steers the harvester along a crop line at the maximum harvester speed, with operator intervention being required, at the most, only as the harvester approaches the end of a crop field.

Apparatus that can be utilized for detecting the crop line can be divided into two categories: range-based methods which attempt to detect the height difference between the cut and uncut crop; and vision-based methods which attempt to detect appearance differences between the crop on the cut and uncut side of the crop line. Range-based methods can include a scanning laser rangefinder, a laser light stripper, a stereo system, and an optical flow method. Vision based methods can include a feature tracking technique and segmentation on the basis of texture, intensity, and color.

During development of the present invention consideration was given to a configuration utilizing a two-axis scanning laser rangefinder. This sensor scans a laser beam over a scene and measures the time it takes for the reflected light to return to the sensor. The system returns depth information over a 360 degree azimuth and a 40 degree elevation field of view. The sensor makes about ten sweeps a second and thus takes roughly twenty seconds to generate a full 2048 by 200 range image. This scanner is capable of detecting height differences of only a few cm at a range of 20 meters, and in field tests, the height difference between the cut and uncut crop showed up quite clearly. The drawbacks for this system include slow cycle time, high cost, and concerns about mechanical reliability.

Another alternative system considered for evaluation was a laser light striping sensor. Light striping systems have two components: a light source, and a camera tuned to detect only the frequencies emitted by the light source. Typically, a laser beam is sent through a cylindrical lens which spreads the linear beam into a plane. This plane intersects the scene in an illuminated line. Distances to all the points on the line can then be estimated by triangulation.

The light striper has no moving parts, requires only minimal computational power, and is potentially inexpensive. However, since harvesters function outdoors, a prohibitively powerful laser would be needed to gather range information at the necessary distance (around 5 meters) in order to avoid being washed out by sunlight. The light striper system also has the disadvantage that it returns only a linear array of depths, so that only one point along the cut line can be detected at a time.

Stereo cameras provide another possible alternative range-based approach to detecting the crop cut line, based on another triangulation-based method. Depth information is obtained by viewing the same object from two or more different viewpoints simultaneously, as with the human vision system. In this application, extremely precise depth information is not needed. We therefore investigated two camera systems with relatively small baselines (between 6 inches and two feet). The storm stereo algorithm, as defined in an article for the 1993 IEEE Conference on Computer Vision and Pattern Recognition, by Bill Ross, entitled "A Practical Stereo Vision System", was used to compute the correspondences. Although it was found that an alfalfa field contains sufficient texture to solve the correspondence problem, computational speed remains a major concern with stereo-based tracking.

An alternative vision-based technique is defined as a window-based feature tracking method, as described in a 1991 Carnegie-Mellon Technical Report published by C. Tomasi and T. Kanade, entitled "Detection and Tracking of Point Features". Starting with an image of the crop cut line, a set of small (approximately 20×30 pixel) windows which overlapped the cut line boundary were selected by hand. These windows were then input as features to the algorithm, and then tracked from one image to the next. In this manner, it was possible to track the crop line across a sequence of twenty images. However, this method still requires that the initial feature windows be chosen along the crop line.

Yet another alternative method which was considered utilized a local 2-D fourier transform operator as the basis for texture-based segmentation, as described in a 1994 article entitled "Segmenting textured 3D surfaces using the space/frequency representation" in Spatial Vision, Volume 8, No. 2. The intent of this method was to locate a spatial frequency band with a substantial difference between the cut and uncut crop. Unfortunately, however, preliminary testing failed to show any clear evidence of such an indicator.

A visual examination of some crop line images showed that portions of the image containing uncut crop were substantially darker and a slightly different hue than the portions containing uncut crop. Of the two, the color difference is generally more pronounced, and is largely due to the exclusive presence of a leaf canopy on the uncut side of the crop line. Due to the consistency of this color effect, the relative robustness of the sensor, and the lower sensor cost, a vision-based system using color segmentation techniques presented the most promising method to pursue for cut line tracking.

Vision-based guidance of agricultural vehicles is not a new idea, and others have investigated the perception problem which is involved. For instance, J. F. Reid and S. W. Searcy, in an article for the ASAE in Nov/Dec, 1988, entitled "An Algorithm for Separating Guidance Information from Row Crop Images", describe a method of segmenting several different crop canopies from soil by intensity thresholding. They do not, however, actually use the algorithm to guide a vehicle. M. Hayashi and Y. Fujii, in an article for the USA-Japan Symposium on Flexible Automation entitled "Automatic Lawn Mower Guidance Using a Vision System", have used smoothing, edge detection and a Hough transform to guide a lawn mower along a cut/uncut boundary. Their algorithm only finds straight boundaries, however, and they give no mention of the speed at which they are able to accomplish this task. Gerhard Jahns presents a review of automatic guidance techniques for agricultural vehicles in a 1983 ASAE paper entitled "Automatic Guidance in Agriculture: A Review". To applicants' knowledge, the work described in this paper is the only system which has ever been successfully used to guide a harvesting machine.

SUMMARY OF THE INVENTION

An object of the present invention is to provide a vision-based method and apparatus for automatically steering a self-propelled harvester along a crop line.

Another object of the invention is to provide a method and apparatus for automatically steering a self-propelled harvester along a crop line by providing a viewing means, preferably a color video camera, mounted on the harvester for forming an image of the landscape, including a crop line, in front of the harvester, line scanning at least a window of the image on a pixel-by-pixel basis, generating for each pixel position a discriminant function signal, and analyzing the discriminant function signals to develop steering signals for steering the harvester along the crop line.

The discriminant function may be percent intensity within a single spectral band or the ratio between two spectral bands.

The discriminant function signals are supplied to a segmenter which determines, for each scan line, the step function which best fits the magnitudes of the discriminant function signals. The pixel location in of the step in this step function is presumed to indicate the location of the crop line and is taken as a vote on the preferred steering direction. The votes for each pixel location are summed over a complete scan of the image and then normalized. The normalized votes derived from plural successive images are time weighted and averaged to obtain the command for commanding the steering direction.

Other objects of the invention will be evident upon consideration of the following description and claims.

DESCRIPTION OF PREFERRED EMBODIMENTS

Figure 1:
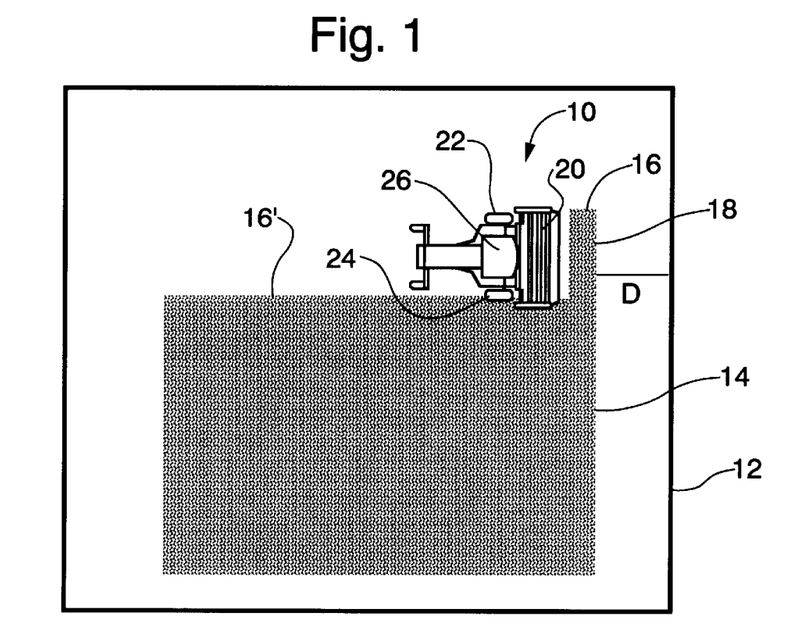
FIG. 1 illustrates a harvester moving over a field in which a portion of the crop has been cut.

FIG. 1 illustrates a self-propelled agricultural harvester 10 in the process of cutting a crop in a field having a boundary 12. The uncut portion of the crop is indicated by the shaded area 14. The edge or division between the cut crop and the uncut crop in front of the harvester is generally referred to as the crop line and is designated by the reference numeral 16. Conventionally, the entire area of the field is not planted with crop. A headland having a width D is left unplanted at each end of the field and provides an area in which the harvester may turn around. The division between the headland and that portion of the field planted with crop is generally referred to as the "end of row" and is designated by the reference numeral 18. The invention is not limited to use in rectangular fields and the crop area to be cut may be irregular in shape.

Figure 2:
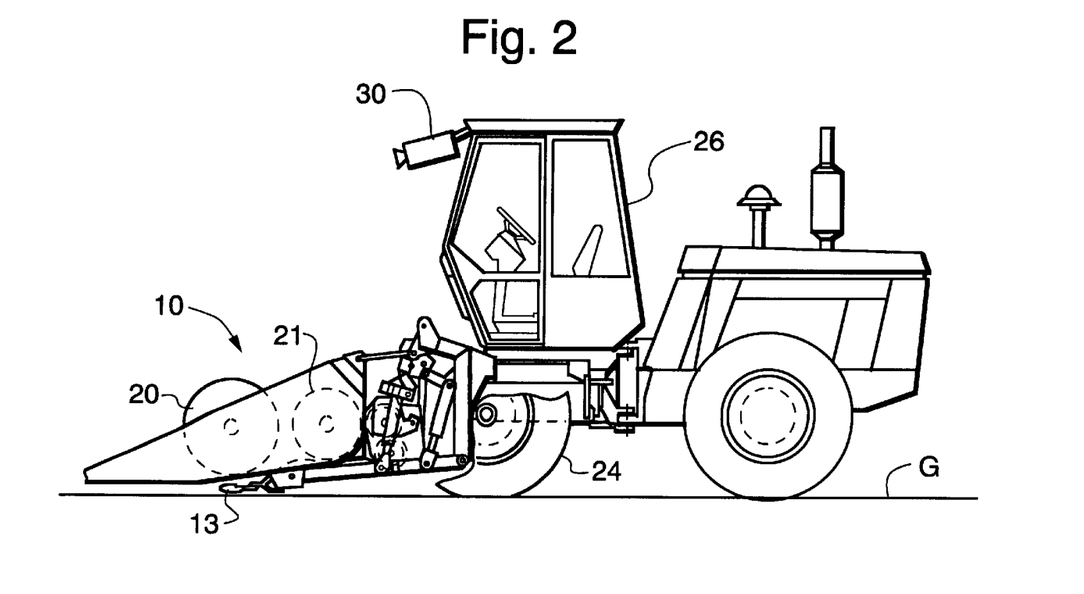
FIG. 2 a side view, partially cut away, of a self-propelled harvester on which the invention may be utilized.

The harvester 10 may take many forms (combine, forage harvester, etc.) but experimentation was carried out using a model 2550 Speedrower™ sold commercially by New Holland North America Inc. This harvester is similar to the one shown in FIG. 2. It cuts and conditions forage crops and discharges the harvested crop on the ground in either a consolidated windrow or a swath substantially as wide as the width of cut of the machine. The harvester has a cutter bar 13 which may be raised and lowered and which is carried slightly above ground level at the front of the harvester when cutting crop. A reel 20 sweeps the cut crop material into conditioning rolls 21 for further conditioning, and the conditioned crop is then discharged.

For use in the present invention, the commercially available harvester was retrofitted with left and right electrohydraulically controlled drive motors 46 and 48 (FIG. 3) for differentially and reversibly driving the front wheels 22,24. The harvester as thus modified is steered by driving the front wheels at different relative speeds.

The harvester 10 is provided with at least one video camera 30 (FIG. 2) mounted on an arm extending outwardly from one side of the harvester. For purposes of experimentation, the camera was supported by an arm mounted near the top of the operator's cab 26 and extending to the left side of the harvester at a height of about 4 m above the ground. The camera is aimed about 5 m ahead of the harvester so as to capture an image of the landscape in front of the harvester. The camera is supported slightly inboard with respect to the left end of the harvester cutter bar so as to be directly over the crop line when the harvester is properly following the crop line. This avoids the necessity of computations relating to offset and permits the steering control algorithm to be based merely on steering the harvester to keep the crop line in the center of the image. Thus, if the harvester is steered so that the camera remains essentially over the crop line the cutter bar will slightly overlap the crop line. This overlap insures that narrow strips of uncut crop material are not left on the field.

Since the camera is supported over the crop line, use of a single camera restricts the field coverage plans or patterns of movement which the operator may follow in cutting a field while still taking advantage of the present invention. For example, if the harvester has a single camera mounted on the left side of the operator's cab 26 so as to track crop line 16

(FIG. 1), it is not possible when the harvester reaches the end of the row to turn the harvester 180° about the right front wheel 26 as a pivot and resume cutting. The new crop line 16' will be to the right of the harvester but the camera is still on the left side. Therefore, in some applications it may be desirable to provide a second camera 30 mounted on the right side of the harvester and a video switch 32 controlled to select the video output signal from the appropriate camera. A single camera permits use of such a wide variety of field coverage plans that the need for two cameras is extremely limited.

Figure 3:
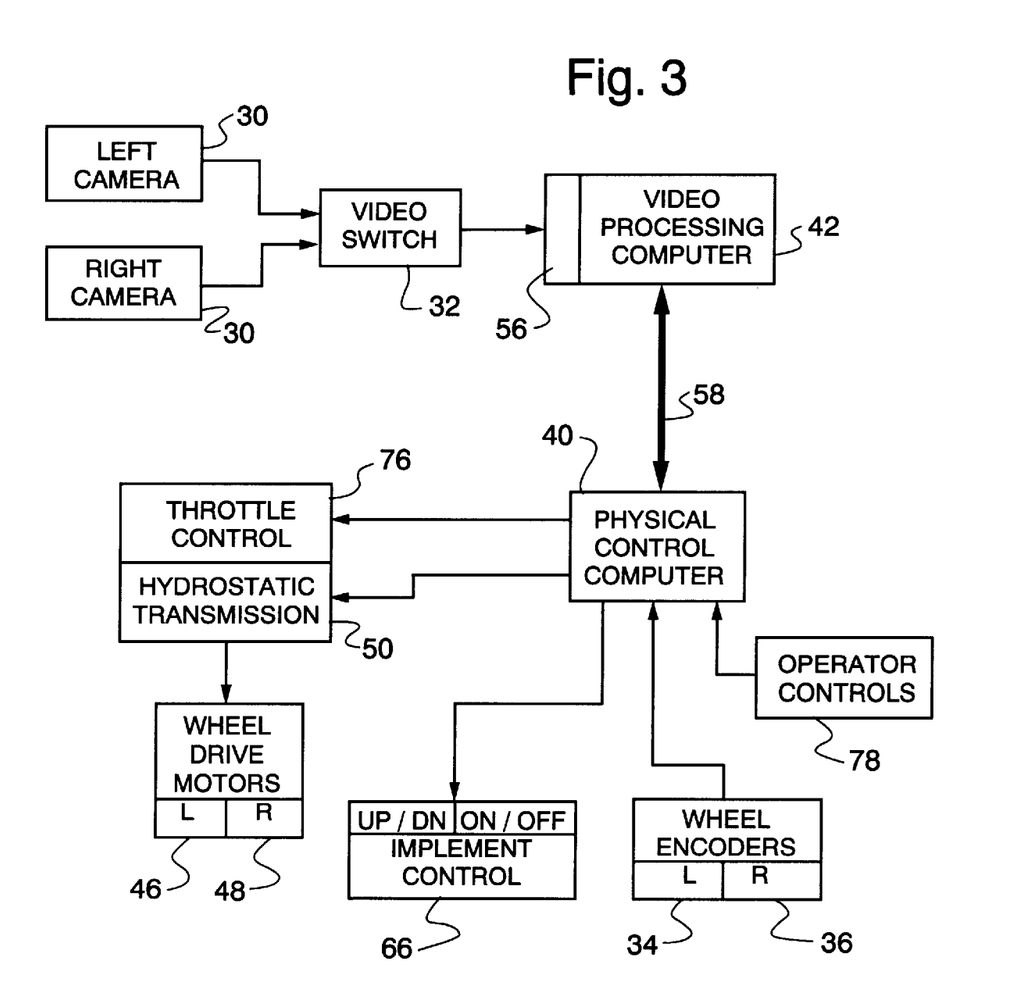
FIG. 3 is a schematic block diagram of the hardware comprising the harvester control system.

As shown in FIG. 3, the major hardware components of the system include at least one and possibly two video cameras 30, a video switch 32 if two cameras are used, a physical control computer 40, a video processing computer 42, left and right wheel drive motors 46, 48, an electrically controlled hydrostatic transmission 50, and conventional operator-actuated controls 78. Physical control computer 40 receives commands from controls 78 and, in response to these commands, generates speed and steering signals and implement control commands for controlling the cutter bar control mechanism 66. The harvester has been provided with left and right front wheel encoders 34 and 36 for purposes not relevant to the present invention.

The physical control computer 40 may be a Motorola model MC68040 supported by the VxWorks real-time operating system. The video processing computer 42 may be a Sun Sparc 20 board running Unix(!) and includes a digitizer 56 for digitizing video signals received from video switch 32. Computers 40 and 42 are interconnected by a serial Ethernet link 58.

A Manual/Auto mode switch (not shown) controls physical control computer 40 to respond to manual steering commands from controls 78 or automatic steering commands developed by video processing computer 42 as subsequently described. The computer 40, in turn, generates steering commands which are applied to the electrically controlled hydrostatic transmission 50. A steering command has a value which is the reciprocal of the radius of curvature of the commanded turn. A steering command may, for example, have one of 21 values between −0.1 (maximum left turn) and +0.1 (maximum right turn) with the value zero commanding steering straight ahead. The electrically controlled hydrostatic transmission 50 includes means for resolving the commands and generating two analog signals. These analog signals control the division of the total available hydraulic fluid flow between the wheel drive motors 46,48 which in turn drive the front wheels at different speeds to cause the harvester to turn. A throttle control 76 governs the total available hydraulic fluid flow and thus sets the harvester speed.

The camera 30 is preferably a color video camera and in the development of the invention a RGB camera was used. The purpose of the camera is to form an electronic image of the landscape in front of the harvester and scan the image line-by-line and pixel-by-pixel to generate a signal containing information as to the spectral content of the image at each pixel position.

It is not necessary to scan an entire image. The scan may be limited to only a window of the image. Furthermore, within a window it is not necessary to utilize every possible scan line. Operator commands, entered into the system from a control panel or keyboard (not shown) may be utilized in -a known manner to control the deflection circuits of the camera to select the size of the window and the skipping of line scans. A window may, for example, be 400 by 300 pixels but this size may be varied considerably.

The purpose of video processing computer 42 is to analyze the digitized video signal representing the scene within the field of view of a camera 30 and generate an indication of where the crop line is relative to the center of the scene. Computer 42 is programmed to implement a discriminator and a segmentor.

Creation of a color segmentation algorithm combines two parts: a discriminator and a segmentor. The discriminator computes a function d(i,j) of individual pixels whose output provides some information about whether that pixel is in the cut region or the uncut region. The segmentor then uses the discriminant to produce a segmentation. For the segmentor to function reliably, it is desirable that the difference in the discriminant between the cut side and the uncut side be as large as possible compared to the standard deviation. Experimentation was carried out using an RGB camera with the discriminant being the percentage intensity within a given spectral or the ratio between two spectral bands. The results are given in Table I.

TABLE I

| Discriminant | cut S.D. | uncut S.D. | uncut mean − cut mean |
|---|---|---|---|
| R | 22.5 | 16.8 | 37.2 |
| G | 23.7 | 20.1 | 27.9 |
| B | 24.3 | 19.5 | 31.0 |
| R/(R + G + B) | 0.020 | 0.013 | 0.033 |
| G/(R + G + B) | 0.018 | 0.007 | −0.020 |
| R/G | 0.096 | 0.043 | 0.137 |

Experiments were also carried out using a black and white camera with six bandpass filters ranging from 300–900 nm, each filter having a pass band of 100 nm. It is noted that the sensitivity of off-the-shelf CCD cameras drops off sharply outside this range. The results are shown in table II.

TABLE II

| Discriminant | cut S.D. | uncut S.D. | uncut mean − cut mean |
|---|---|---|---|
| 650 nm | 8.22 | 22.2 | −59.1 |
| 650 nm/total | 0.005 | 0.020 | −0.051 |
| 550 nm/total | 0.006 | 0.011 | −0.035 |
| 650 nm/750 nm | 0.040 | 0.188 | 0.493 |
| 550 nm/750 nm | 0.057 | 0.112 | 0.357 |

The filter data suggest that using a custom built camera sensitive to only a few narrow frequency bands may provide an advantage over an RGB camera.

Based on the above tables, and by qualitative observation of a number of segmentations the ratio of red to green was selected as the discriminant function. As a substantial database of images is obtained, a Fisher linear discriminant, as described in a 1974 article by T. Young and T. Calvert, entitled "Classification, Estimation and Pattern Recognition", can be used to find the optimal linear discriminant in color space. Using a measure like this on a small set of data may be misleading, however, since the quality of a given discriminant varies considerably for different images.

The discriminator computes from the digitized output signal of a camera a function d(i,j) of individual pixels within a window or region of interest of say 400 by 300 pixels located at the center of the video camera imaging screen.

Figure 4A:
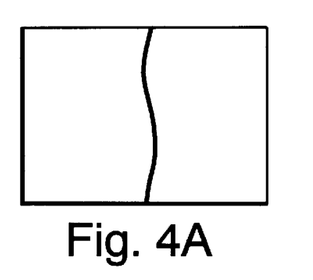
FIGS. 4A–4E are diagrams useful in explaining the mathematical basis of operation of the crop line tracker.
Figure 4B:
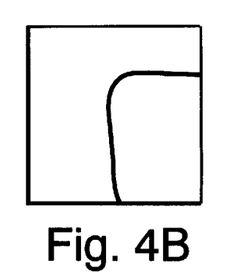
Figure 4C:
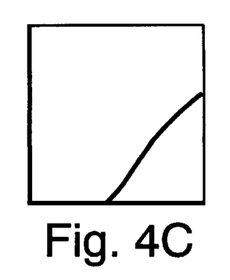
Figure 4D:
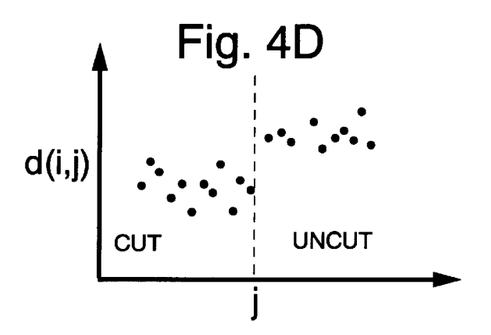

FIG. 4D represents a plot of d(i,j) for a portion of one scan line near the center of the scan line, the discriminant function being green percentage intensity. For each pixel position j the discriminator produces an output signal having a magnitude i related to the percentage green intensity at the pixel position. Because of the foliage on the uncut crop, the d(i,j) are clustered about a first mean value $m_r$ (FIG. 4E) for uncut crop and about a second mean value $m_l$ for cut crop. For the task of defining a segmentor, it was decided to limit efforts to representing segmentations which divide the image into precisely two connected regions. It was also assumed that the boundary between these regions is a single-valued function of the row coordinate, and that this boundary does not intersect either the left or right edge of the image. This boundary function is represented explicitly by the set of pixels which lie on it, so that nothing further is assumed about the shape of the boundary. FIG. 4A shows a representable segmentation, and FIGS. 4B and 4C show some non-representable segmentations. This representation was chosen, not because it accurately characterizes all the images which might need to be segmented, but because it can be computed rapidly. Although images such as the ones in FIGS. 4B and 4C do occur, the chosen representation covers the vast majority of the images which appear in a harvesting operation.

Figure 4E:
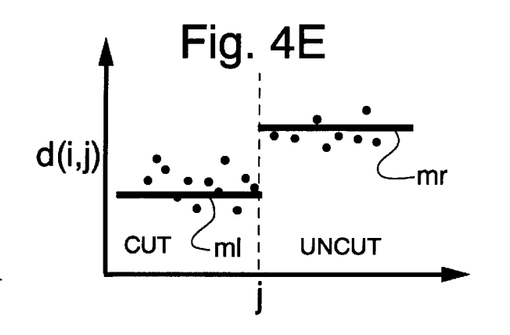

FIG. 4E suggests a step function defined by three parameters: $j_d$, the j coordinate of the discontinuity; $m_l$, the mean value of the step function to the left of the discontinuity; and $m_r$, the mean value of the step function to the right of the discontinuity. Finding the best segmentation is thus a matter of finding the best fit step function (lowest least-squared error) to d(i,j) along a given scan line.

The segmenter may determine $j_d$ according to the following algorithm.

```
smallest_error = infinity
for each possible j_d from j_min to j_max
    compute m_l
    compute m_r
    compute error
    if (error < smallest_error)
        smallest_error = error
        best_j_d = j_d
    end if
end for
```

The bulk of the computing time for this algorithm comes from computing $m_l$, $m_r$, and the error. Computing the means and errors for the first $j_d$ takes order $(j_{max}-j_{min})$ time. However, it requires only a small constant number of operations to recompute $m_l$, $m_r$, and error for subsequent values of $j_d$. The end result is that the entire algorithm requires only order $(j_{max}-j_{min})$ time to find the best fit step function for a given scan line. Using a 400×300 pixel window of the image, a cycle time of roughly 4 Hz can be achieved for the entire system using the algorithm derive below.

Assuming that j is the right-most column or pixel to the left of the discontinuity and that the column numbers vary from 0 to $j_{max}$, $m_l$, $m_r$ and the error may be calculated as functions of $j_d$, these terms being defined for $j_d$ from 0 to $j_{max}-1$.

$$m_l(j_d) = \frac{\sum_{j=0}^{j_d} d(i,j)}{j_d + 1}$$

$$m_r(j_d) = \frac{\sum_{j=j_d+1}^{j_{max}} d(i,j)}{j_{max} - j_d}$$

$$error = \frac{\sqrt{\sum_{j=0}^{j_d}[d(i,j)-m_l]^2 + \sum_{j=j_d+1}^{j_{max}}[d(i,j)-m_r]^2}}{j_{max}+1}$$

It requires order n time to compute error($j_d$) from the d(i,j) alone. However, it is possible to compute error($j_d$+1) from error($j_d$) in constant time by expressing the calculation of error($j_d$) in terms of the following functions:

$$t_l(j_d) = \sum_{j=0}^{j_d} d(i,j) \quad (1)$$

$$t_r(j_d) = \sum_{j=j_d+1}^{j_{max}} d(i,j) \quad (2)$$

$$t2_l(j_d) = \sum_{j=0}^{j_d} [d(i,j)]^2 \quad (3)$$

$$t2_r(j_d) = \sum_{j=j_d+1}^{j_{max}} [d(i,j)]^2 \quad (4)$$

From equations 1–4, error($j_d$) may be calculated.

$$error(j_d) = \frac{\sqrt{\left(t2_l(j_d) - \frac{[t_l(j_d)]^2}{j_d+1}\right) + \left(t2_r(j_d) - \frac{[t_r(j_d)]^2}{j_{max}-j_d}\right)}}{j_{max}+1} \quad (5)$$

Next, equations 1–4 may be re-expressed recursively:

$$t_l(0) = d(i,0) \quad (6)$$

$$t_l(j_d) = t_l(j_d - 1) + d(i, j_d)$$

$$t_r(0) = \sum_{j=1}^{j_{max}} d(i,j) \quad (7)$$

$$t_r(j_d) = t_r(j_d - 1) - d(i, j_d)$$

$$t2_l(0) = [d(i,0)]^2 \quad (8)$$

$$t2_l(j_d) = t2_l(j_d - 1) + [d(i, j_d)]^2$$

-continued $$r2_r(0) = \sum_{j=1}^{j_{max}} [d(i, j)]^2 \quad (9)$$

$$t2_r(j_d) = t2_r(j_d - 1) - [d(i, j_d)]^2$$

It takes only a constant number of operations to compute $t_l$, $t_r$, $t2_l$, and $t2_r$ at $j_d+1$ given their values at $j_d$. Equation 5 is then used to calculate the error at $j_d+1$.

The calculation may be accomplished with even fewer steps if some monotonic 1-to-1 function of error($j_d$) is computed rather than error($j_d$). For example computing $$f(j_d) = [\text{error}(j_d) \cdot (j_{max}+1)]^2 \quad (10)$$

saves a square root and a division operation at each step. Better yet, it is possible to compute $$f(j_d) = [\text{error}(j_d) \cdot (j_{max}+1)]^2 - \sum_{j=0}^{j_{max}} d(i, j) \quad (11)$$

which can be computed recursively using the following three equations.

$$t_l(0) = d(i, 0) \quad (12)$$

$$t_l(j_d) = t_l(j_d - 1) + d(i, j_d)$$

$$t_r(0) = \sum_{j=1}^{j_{max}} d(i, j) \quad (13)$$

$$t_r(j_d) = t_r(j_d - 1) - d(i, j_d)$$

$$f(j_d) = \frac{-[t_l(j_d)]^2}{j_d + 1} + \frac{-[t_r(j_d)]^2}{j_{max} - j_d} \quad (14)$$

As compared to computing error($j_d$) directly, this results in an increase in cycle rate (reduction in computing time) of approximately 30%.

Figure 5A:
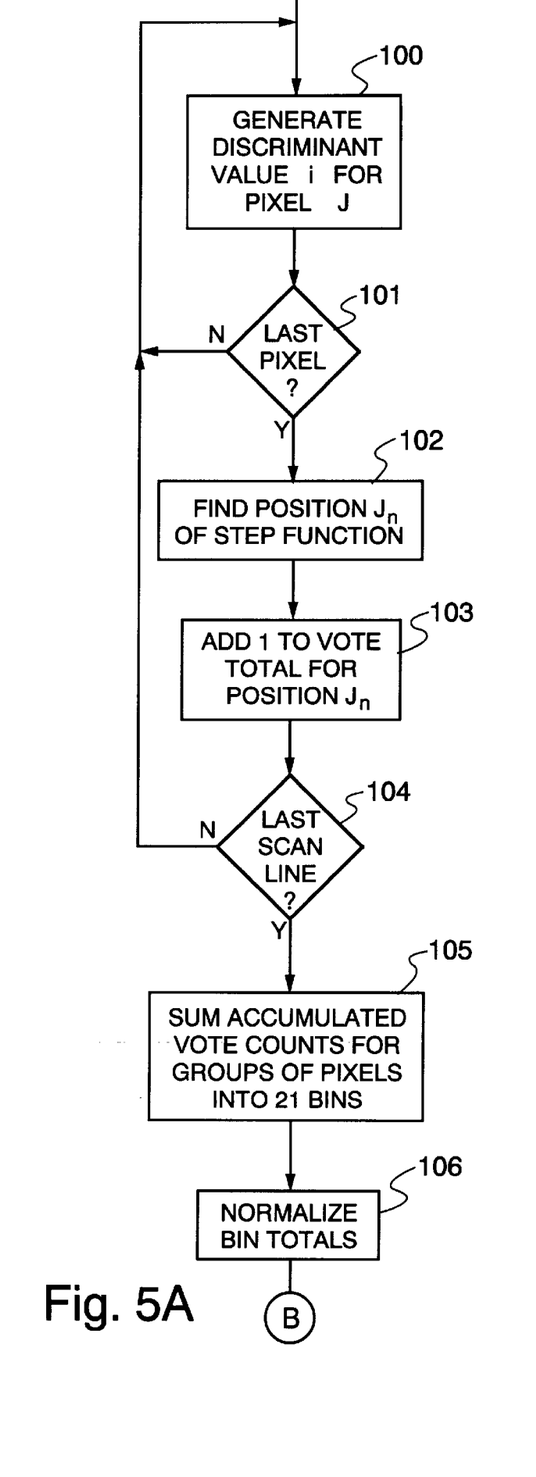
FIGS. 5A and 5B comprise flow chart illustrating the operation of the crop line tracker; and, FIG. 6 comprises graphs illustrating the effect of time weighting and averaging crop line tracker steering signals.
Figure 5B:
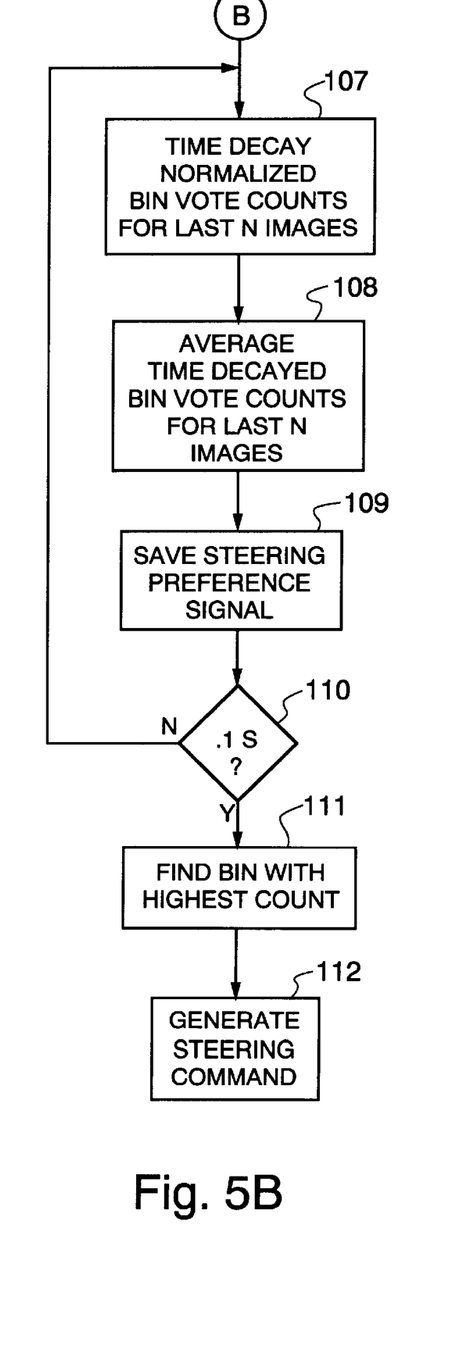

FIGS. 5A and 5B illustrate a program routine executed by video processing computer 42 to generate a steering command from the digitized video signals obtained by scanning electronic images formed on the screen of camera 30 as the camera views the landscape in front of the harvester. Step 100 computes and saves the discriminant value i for one pixel j according to the discriminant function being used, for example the ratio red/green. Step 101 determines if this is the last pixel to be examined in the current scan line and if it is not the last pixel step 100 is executed again to develop and save a discriminant value i for the next pixel. Assuming the window being analyzed is 400 pixels wide, steps 100 and 101 are repeated 400 times to develop and save 400 values $i_1$–$i_{400}$. After a value i has been computed for each location j on one scan line, the test at step 101 proves true and the routine advances to step 102 which computes a best fit step function for these values. The location of the step defines a pixel location $j_n$ which in turn represents the segmentation, that is, the location of the crop line between cut and uncut crop as determined from the current scan line. The segmenter output signal produced at step 102 is a binary signal having a bit position corresponding to each pixel position on a single scan line and within the window of interest. The signal has in it a single 1-bit in the position corresponding to the computed step function pixel location $j_n$. This bit represents a crop line tracker "vote" on the steering angle or direction in which the harvester should be steered so as to track the crop line and keep the crop line image at the center of the window.

Ideally, the votes on the steering direction should be in the same bit position of each output signal when the harvester is tracking the crop line. However, in actual practice cropless bare spots, areas of poor or dead crop, and other anomalies cause the votes to be distributed among different bit positions for different scan lines. An accumulator is provided for each pixel position and at step 103 the vote generated at step 102 is added into the accumulator which accumulates votes for pixel location $j_n$.

The segmenter produces one output signal or vote for each scan line within the window or region of interest. Step 104 determines if the last scan line of the window has been processed. If the last scan line has not been processed, a return is made to step 100 and steps 100–103 are repeated to develop a vote on the steering direction for the next scan line.

Assuming the window is 100 pixel high, step 104 detects when all 100 scan lines of the image within the window have been processed and the program advances to step 105. At this point the crop line tracker has developed, from one complete scan of the image, 100 votes on the steering direction, these votes being distributed among 400 vote accumulators. However the electrical controls of hydrostatic transmission 50 (FIG. 3) are capable of controlling steering at only 21 different degrees of curvature. Therefore, the 400 pixel positions are divided into groups of adjacent positions and assigned to 21 bins. The accumulated vote counts for all pixel positions assigned to a given bin are then summed at step 105 to obtain 21 bin vote counts. At step 106 the bin vote counts are normalized by dividing them by 100 and the normalized vote counts are saved. Thus, for each image the crop line tracker produces 21 normalized bin votes on the steering direction, each normalized vote having a value between 0.0 and 1.0 and the sum of the normalized votes being 1. The normalized bin votes are saved in memory for further processing as subsequently described.

As previously noted, the size of the window image need not be 400×100 pixels and it is not necessary to process every pixel position of the image within the window. For example, the processing of every third or fourth pixel may be eliminated to reduce signal processing time if the uncut crop is relatively uniform over the field and is easy to discriminate from the cut portion of the field.

Figure 6:
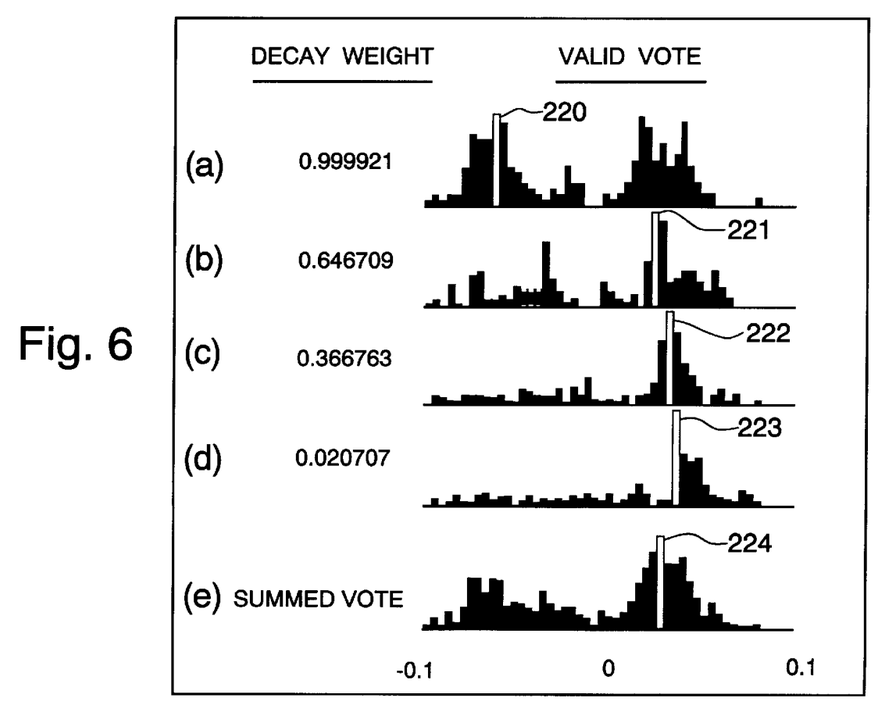

The normalized bin vote counts saved at step 106 as a result of scanning one image are time-decayed and averaged with the bin vote counts resulting from scans of previous images. The reason for this may be explained with reference to FIG. 6 which illustrates a typical situation for the case of a poor crop. The figure is drawn for the case of more than 21 steering directions to more clearly demonstrate the smoothing function. In FIG. 6, assume that graphs (a)–(d) represent the bin vote counts generated as a result of scanning four successive images, graph (a) being for the most recent image. Each vertical bar in a graph represents the vote count in one of the bins, that is, the accumulated vote count for one bin as developed by the crop line tracker at step 105 in FIG. 5A and before the vote counts are normalized. In each graph, the votes accumulated for each image have been time weighted by a factor as indicated to the left of each graph.

In graph (a), the bin or steering direction referenced 220 has the highest vote sum hence if the votes derived from this image alone were considered, the harvester would be commanded to make a rather extreme turn to the left because this bin is separated from the "straight ahead" bin, represented by 0, by about 15 bins. On the other hand, for the preceding three images the vote summations for the bins referenced 221, 222 and 223, respectively, are the greatest hence if the vote summations for these images were acted on alone, the harvester would be commanded to steer gently to the right by slightly varying degrees.

The vote summations in graph (a) obviously resulted from some anomaly and would cause an undesirable left steer if acted on alone. To avoid such an action, the bin vote counts for several images are saved and decayed in value over time, and the decayed vote count values are then added together. Graph (e), which is not to the same scale as graphs (a)–(d), shows the result. By time weighting and summing the normalized vote counts in corresponding bins for the four images, the bin referenced 224 has the largest sum. Thus, by considering the votes over four images, the erroneous steering indication represented in graph (a) may be filtered or averaged out and the harvester commanded to steer slightly to the right even though analysis of the most recent image indicates that a hard left steer is needed.

Referring to FIG. 5B, step 107 time weights or decays each of the 21 normalized bin vote counts resulting from the scans of the last n images. Although FIG. 6 illustrates the summation of votes for n=4 images, n may be any fixed number or the number of images processed by the crop line tracker 102 within a fixed interval of say 1 or 2 seconds.

Step 108 averages the decayed normalized bin vote counts obtained at step 107 to generate a steering preference signal. From the foregoing description it is evident that the steering preference signal comprises 21 bins or values. The steering preference signal is then saved at step 109.

After the steering preference signal is saved, step 110 checks a timer to see if 0.1 second has elapsed. Steering commands are generated at intervals of 0.1 sec. If step 110 determines that 0.1 second has not elapsed since generation of the last steering command, steps 107–109 are repeated. After 0.1 second the test at step 110 proves true and step 111 is executed. Step 111 examines each of the 21 bin totals saved at step 109 and determines which bin has the largest total. A steering command is then generated (step 112), the steering command having a 1-bit in the position corresponding to the position of the bin found to have the largest value.

The steering commands produced at step 112 are transferred from computer 42 through computer 40 to the electrical controls of transmission 50 which decode the commands as described above to differentially drive the front wheels and thereby steer the harvester in the commanded direction.

The invention described above is capable of acting as a "cruise control", relieving the operator of the responsibility of steering the harvester. It may be used in conjunction with an end of row detector which slows or stops the forward progress of the harvester and signals the operator to assume manual control to accomplish turning. The invention may also be incorporated into a fully automated control system which also controls turning, thereby eliminating the necessity for an operator on the harvester.

While the invention has been described with respect to a preferred embodiment, it will be understood that various substitutions and/or modifications may be made in the described embodiment without departing from the spirit and scope of the invention as defined by the appended claims.

We claim:

1. A method of steering an agricultural harvester along a crop line, the harvester having control means for steering wheels to thereby steer the harvester, said method comprising:
   a) mounting on said harvester a viewing means oriented to view and form an image of a landscape, including a crop line, in front of the harvester;
   b) scanning at least a window of the image pixel-by-pixel and line-by-line to produce information signals representing said image;
   c) generating, from the information signals, a plurality of discriminant function signals $D(i,j)$ for each scan line, where j is the relative position of a pixel on a scan line and i is the magnitude of a discriminant function for pixel j;
   d) determining, for each scan line, a pixel position $j_n$ representing the pixel position of a step in a step function which best fits the magnitudes of the discriminant function signals produced for the scan line;
   e) developing a sum of the number of times the step function occurs at each pixel position during a complete scan of the window to develop, for that window, vote counts indicating steering direction preferences;
   f) repeating steps b) through e); and,
   g) applying to the control means a steering signal determined from the vote counts developed for a plurality of windows.

2. A method as claimed in claim 1 wherein, in step e), the vote counts are normalized and in step g) the steering signal is determined from the normalized vote counts.

3. A method as claimed in claim 1 wherein, in step e), the vote counts are developed by assigning groups of adjacent pixel locations to bins, determining, for each bin, a bin sum representing the number of times the step of the step function occurs at any pixel location assigned to the bin, and normalizing the bin sums to obtain said vote counts.

4. A method as claimed in claim 1 wherein, during step g), the vote counts developed for a plurality of windows are averaged to determine the steering signal applied to the control means.

5. A method as claimed in claim 1 wherein, in step g), the vote counts developed for a plurality of windows are time weighted and then averaged to determine the steering signal applied to the control means.

6. A method as claimed in claim 1 wherein, in step e), the vote counts are developed by assigning groups of adjacent pixel locations to bins, determining, for each bin, a bin sum representing the number of times the step of the step function occurs at any pixel location assigned to the bin, and normalizing the bin sums to obtain said vote counts, and wherein during step g), the vote counts developed for a plurality of windows are time weighted and then averaged to determine the steering signal applied to the control means.

7. A method as claimed in claim 1 wherein step a) comprises mounting a color video camera on the harvester.

8. A method as claimed in claim 1 wherein step a) comprises mounting a RGB video camera on the harvester.

9. A method as claimed in claim 1 wherein step a) comprises mounting on the harvester a black and white video camera having a plurality of associated band pass filters.

10. A method as claimed in claim 1 wherein said discriminant function is the ratio between two given spectral bands.

11. A method as claimed in claim 1 wherein said discriminant function is the ratio of red to green color.

12. A method as claimed in claim 1 wherein said discriminant function is the percentage intensity within a given spectral band.

13. A self-propelled agricultural harvester having control means for steering wheels to thereby steer the harvester, said harvester further comprising:

a viewing means mounted on the harvester and oriented to view and form images of a landscape, including a crop line, in front of the harvester, the viewing means having associated therewith a scanning means for scanning at least a window of an image pixel-by-pixel and line-by-line to produce information signals representing said image;

first means for generating, from the information signals, a plurality of discriminant function signals $D(i,j)$ for each scan line, where j is the relative position of a pixel on a scan line and i is the magnitude of a discriminant function for pixel j;

second means, responsive to said first means, for determining, for each scan line, a pixel position $j_n$ representing the pixel position of a step in a step function which best fits the magnitudes of the discriminant function signals produced for the scan line;

a plurality of counters, there being at least one counter corresponding to each pixel position of the window on one scan line, said counters being responsive to said second means for accumulating totals of the number of times said step occurs at each pixel position during a complete scan of one image, said totals representing vote counts indicating steering direction preferences; and, third means, responsive to said vote counts, for applying to the control means a steering signal determined from the vote counts.

14. A harvester as claimed in claim 13 wherein said third means comprises means for averaging the vote counts produced by said counters during scanning of successive images in said window.

15. A harvester as claimed in claim 14 wherein said third means further comprises means for time-weighting the vote counts produced for successive images prior to averaging them so that the vote counts produced for more recent images have greater weight in determining said steering signal.

16. A harvester as claimed in claim 13 wherein said third means includes accumulator means for accumulating bin vote counts by totaling the vote counts produced by said counters for groups of adjacent pixel positions.

17. A harvester as claimed in claim 16 wherein said third means further comprises means for averaging the bin vote counts accumulated by said accumulator means for successive images in said window.

18. A harvester as claimed in claim 17 wherein said third means further comprises means for time-weighting the bin vote counts produced for successive images prior to averaging them so that the bin vote counts produced for more recent images have greater weight in determining said steering signal.

19. A harvester as claimed in claim 13 wherein said viewing means comprises a color video camera and said first means generates discriminant function signals having magnitudes determined by the ratio of two colors at each pixel position.

20. A harvester as claimed in claim 13 wherein said viewing means is a color video camera and said first means generates discriminant function signals having magnitudes determined by the percentage intensity within a given spectral band.

21. A harvester as claimed in claim 13 wherein said control means for steering said wheels comprises first and second drive motors for driving a first and a second of said drive wheels, respectively at different rotational speeds to steer said harvester.

* * * * *